United States Patent
Kong et al.

(10) Patent No.: US 10,541,992 B2
(45) Date of Patent: *Jan. 21, 2020

(54) TWO-TOKEN BASED AUTHENTICATED SESSION MANAGEMENT

(71) Applicant: Google LLC, Mountain View, CA (US)

(72) Inventors: Guibin Kong, Fremont, CA (US); Naveen Agarwal, Los Altos, CA (US)

(73) Assignee: Google LLC, Mountain View, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/395,448

(22) Filed: Dec. 30, 2016

(65) Prior Publication Data

US 2018/0191700 A1 Jul. 5, 2018

(51) Int. Cl.
*H04L 29/06* (2006.01)
*H04L 29/08* (2006.01)
*H04L 12/24* (2006.01)

(52) U.S. Cl.
CPC .......... *H04L 63/083* (2013.01); *H04L 41/046* (2013.01); *H04L 63/0807* (2013.01); *H04L 63/0884* (2013.01); *H04L 63/108* (2013.01); *H04L 67/14* (2013.01); *H04L 67/306* (2013.01)

(58) Field of Classification Search
CPC . H04L 63/083; H04L 41/046; H04L 63/0807; H04L 67/14; H04L 67/306; H04L 63/0884; H04L 63/108
USPC .......................................................... 726/9
See application file for complete search history.

(56) References Cited

U.S. PATENT DOCUMENTS

| 6,161,182 A | 12/2000 | Nadooshan | |
|---|---|---|---|
| 6,609,198 B1 * | 8/2003 | Wood | G06F 21/31 713/155 |
| 7,145,898 B1 * | 12/2006 | Elliott | H04L 12/66 370/352 |

(Continued)

FOREIGN PATENT DOCUMENTS

WO  WO-2015126124 A1 *  8/2015  ........... H04L 9/3226

OTHER PUBLICATIONS

Albuquerque, Paulo, "Implementing OAuth 2 with Oracle Access Manage OAuth Services (Part V)" Sep. 30, 2015, available at http://www.ateam-oracle.com/implementing-oauth-2-with-oracle-access-manager-oauth-services-part-v/ printed on Dec. 1, 2016.

(Continued)

*Primary Examiner* — Shahriar Zarrineh
(74) *Attorney, Agent, or Firm* — Lerner, David, Littenberg, Krumholz & Mentlik, LLP

(57) ABSTRACT

A system maintains a web session across multiple web resources and/or devices using a two-token model. A user agent transmits an authentication request to a login endpoint. The user agent have access to a grant token, and it will receive an access token in response to the authentication request. The grant token is relatively long-lived and the first access token is relatively short-lived. The user agent will use the access token to access the first web resource and establish a web session. When the access token expires or is about to expire, the user agent will transmit a re-authentication request with the grant token to a re-authentication endpoint. The user agent will then receive a second access token from the re-authentication endpoint. The user agent will then use the second access token to access the web resource and maintain the web session.

23 Claims, 8 Drawing Sheets

(56) References Cited

U.S. PATENT DOCUMENTS

| | | | | |
|---|---|---|---|---|
| 7,174,383 | B1* | 2/2007 | Biswas | H04L 63/0815 709/229 |
| 7,895,445 | B1* | 2/2011 | Albanese | G06F 21/335 713/172 |
| 7,979,555 | B2* | 7/2011 | Rothstein | H04L 29/06 709/224 |
| 8,032,922 | B2* | 10/2011 | Bhatia | G06F 21/6218 726/2 |
| 8,346,967 | B2* | 1/2013 | Jones | G06F 17/30 709/238 |
| 8,478,693 | B1* | 7/2013 | Weigle | G06F 21/10 705/51 |
| 8,505,085 | B2 | 8/2013 | Logan et al. | |
| 8,607,306 | B1* | 12/2013 | Bridge | H04L 63/068 726/1 |
| 8,621,201 | B2 | 12/2013 | Costa et al. | |
| 8,656,472 | B2* | 2/2014 | McMurtry | G06F 21/335 726/9 |
| 8,800,009 | B1 | 8/2014 | Beda, III et al. | |
| 8,850,037 | B2 | 9/2014 | McDonough et al. | |
| 8,881,250 | B2* | 11/2014 | Yefimov | H04W 12/06 726/7 |
| 8,935,757 | B2* | 1/2015 | Srinivasan | H04L 63/10 726/4 |
| 9,106,642 | B1* | 8/2015 | Bhimanaik | G06F 21/335 |
| 9,118,657 | B1* | 8/2015 | Shetty | H04L 63/0815 |
| 9,130,926 | B2* | 9/2015 | Nori | H04L 63/0807 |
| 9,178,868 | B1* | 11/2015 | Leung | H04L 67/02 |
| 9,178,875 | B2 | 11/2015 | Lu et al. | |
| 9,203,620 | B1 | 12/2015 | Nystrom | |
| 9,231,935 | B1* | 1/2016 | Bridge | H04L 63/068 |
| 9,241,269 | B1* | 1/2016 | Giridharan | H04W 12/06 |
| 9,294,484 | B2* | 3/2016 | Fukuda | H04L 63/104 |
| 9,325,696 | B1* | 4/2016 | Balfanz | H04L 63/0815 |
| 9,350,728 | B2 | 5/2016 | Lu et al. | |
| 9,363,254 | B2* | 6/2016 | Beckhardt | G06F 16/44 |
| 9,397,990 | B1* | 7/2016 | Taly | H04L 63/08 |
| 9,674,699 | B2* | 6/2017 | Kanov | H04W 12/06 |
| 9,819,665 | B1* | 11/2017 | Machani | H04L 63/08 |
| 9,819,672 | B1* | 11/2017 | Machani | H04L 63/083 |
| 10,091,204 | B1* | 10/2018 | Triandopoulos | H04L 63/102 |
| 10,200,357 | B2* | 2/2019 | Grajek | H04L 63/083 |
| 2003/0182242 | A1* | 9/2003 | Scott | G06Q 20/12 705/65 |
| 2004/0098595 | A1* | 5/2004 | Aupperle | H04L 63/0815 713/185 |
| 2005/0154923 | A1* | 7/2005 | Lok | H04L 63/0428 726/19 |
| 2005/0204148 | A1* | 9/2005 | Mayo | H04L 63/0815 713/185 |
| 2006/0026260 | A1* | 2/2006 | Mullen | G06F 9/44526 709/217 |
| 2006/0236105 | A1* | 10/2006 | Brok | H04W 12/06 713/169 |
| 2006/0294192 | A1* | 12/2006 | Mao | H04L 63/102 709/213 |
| 2007/0289002 | A1* | 12/2007 | van der Horst | G06F 21/42 726/9 |
| 2009/0193507 | A1* | 7/2009 | Ibrahim | H04L 63/0807 726/9 |
| 2009/0217048 | A1* | 8/2009 | Smith | H04L 63/06 713/176 |
| 2010/0011391 | A1* | 1/2010 | Carpenter | H04N 7/17318 725/25 |
| 2010/0306668 | A1* | 12/2010 | Williams, III | H04L 9/32 715/741 |
| 2011/0271099 | A1* | 11/2011 | Preiss | H04L 63/0807 713/155 |
| 2012/0054847 | A1* | 3/2012 | Schultz | G06F 21/33 726/9 |
| 2012/0254957 | A1* | 10/2012 | Fork | G06F 21/33 726/6 |
| 2012/0260322 | A1 | 10/2012 | Logan et al. | |
| 2012/0266229 | A1* | 10/2012 | Simone | G06F 21/41 726/9 |
| 2013/0054968 | A1* | 2/2013 | Gupta | H04L 63/0428 713/168 |
| 2013/0179961 | A1* | 7/2013 | Abe | G06F 21/44 726/9 |
| 2013/0221083 | A1* | 8/2013 | Doss | H04W 12/04 235/375 |
| 2013/0252583 | A1* | 9/2013 | Brown | H04W 12/06 455/411 |
| 2013/0268687 | A1* | 10/2013 | Schrecker | H04W 12/06 709/229 |
| 2014/0026193 | A1* | 1/2014 | Saxman | G06F 21/33 726/4 |
| 2014/0075513 | A1* | 3/2014 | Trammel | H04L 9/3213 726/4 |
| 2014/0123236 | A1* | 5/2014 | Hirata | H04L 63/0807 726/4 |
| 2014/0173695 | A1* | 6/2014 | Valdivia | G06F 21/36 726/4 |
| 2014/0181944 | A1* | 6/2014 | Ahmed | H04W 12/06 726/8 |
| 2014/0223516 | A1* | 8/2014 | Vongsouvanh | H04L 63/0492 726/4 |
| 2014/0230020 | A1* | 8/2014 | Mogaki | H04L 63/10 726/4 |
| 2014/0237580 | A1* | 8/2014 | Kato | H04L 63/08 726/9 |
| 2014/0282986 | A1* | 9/2014 | Leung | H04L 63/0807 726/9 |
| 2014/0317187 | A1* | 10/2014 | Tsujimoto | G06F 17/30011 709/204 |
| 2014/0380428 | A1* | 12/2014 | Kobayashi | G06F 21/335 726/4 |
| 2015/0071074 | A1* | 3/2015 | Zaidi | H04L 45/308 370/235.1 |
| 2015/0089569 | A1* | 3/2015 | Sondhi | H04L 63/08 726/1 |
| 2015/0089614 | A1* | 3/2015 | Mathew | H04L 67/141 726/7 |
| 2015/0180863 | A1* | 6/2015 | Kobayashi | H04L 47/70 726/9 |
| 2015/0207790 | A1 | 7/2015 | Lu et al. | |
| 2015/0281222 | A1* | 10/2015 | Burch | H04L 63/0838 726/6 |
| 2015/0334049 | A1* | 11/2015 | Miura | H04L 67/02 709/203 |
| 2015/0341347 | A1* | 11/2015 | Kong | H04L 63/08 726/4 |
| 2015/0350186 | A1* | 12/2015 | Chan | H04L 63/083 726/9 |
| 2015/0365348 | A1* | 12/2015 | Matsuda | H04L 67/10 709/225 |
| 2016/0028737 | A1* | 1/2016 | Srinivasan | H04L 63/0807 726/1 |
| 2016/0044035 | A1* | 2/2016 | Huang | H04L 63/0272 726/4 |
| 2016/0065579 | A1* | 3/2016 | Chen | G06F 21/45 726/4 |
| 2016/0071094 | A1* | 3/2016 | Krishnaiah | G06Q 20/363 705/66 |
| 2016/0080383 | A1* | 3/2016 | Hockings | H04L 63/0846 726/9 |
| 2016/0099924 | A1* | 4/2016 | Mehta | H04L 67/1002 726/7 |
| 2016/0105420 | A1* | 4/2016 | Engan | H04L 9/3228 455/411 |
| 2016/0164920 | A1* | 6/2016 | Borovoy | G06F 21/44 726/1 |
| 2016/0205108 | A1* | 7/2016 | Si | H04L 63/102 726/4 |
| 2016/0259936 | A1* | 9/2016 | Mukherjee | G06F 21/45 |
| 2016/0269388 | A1* | 9/2016 | Ezell | H04L 41/18 |
| 2016/0337326 | A1* | 11/2016 | O'Hare | H04L 9/083 |
| 2016/0350748 | A1* | 12/2016 | Pruthi | G06Q 20/3674 |
| 2016/0359861 | A1* | 12/2016 | Manov | H04L 63/102 |

(56) References Cited

U.S. PATENT DOCUMENTS

| | | | |
|---|---|---|---|
| 2017/0012951 A1* | 1/2017 | Mennes | H04L 9/3215 |
| 2017/0099148 A1* | 4/2017 | Ochmanski | H04L 9/3247 |
| 2017/0099280 A1* | 4/2017 | Goel | H04L 63/083 |
| 2017/0127276 A1* | 5/2017 | Koo | H04L 9/3226 |
| 2017/0132627 A1* | 5/2017 | Phillips | G06Q 20/401 |
| 2017/0171201 A1* | 6/2017 | Matsugashita | G06F 21/6245 |
| 2017/0178193 A1* | 6/2017 | Jagannath | G06Q 30/04 |
| 2017/0195457 A1* | 7/2017 | Smith, II | H04L 63/102 |
| 2017/0317898 A1* | 11/2017 | Candito | H04L 43/045 |
| 2017/0353451 A1* | 12/2017 | Metke | H04W 4/90 |
| 2018/0020005 A1* | 1/2018 | Beiter | H04L 63/10 |
| 2018/0025148 A1* | 1/2018 | Jain | G06F 21/34 |
| | | | 713/166 |
| 2018/0063108 A1* | 3/2018 | Gargaro | H04L 49/109 |
| 2018/0077143 A1* | 3/2018 | Sridharan | G06Q 10/10 |
| 2018/0124068 A1* | 5/2018 | Ruhlen | H04L 63/108 |
| 2018/0176207 A1* | 6/2018 | Malatesha | G06F 3/1454 |
| 2018/0191701 A1* | 7/2018 | Kong | H04L 63/0853 |
| 2018/0324172 A1* | 11/2018 | Unnikrishnan | H04L 63/0815 |
| 2018/0332016 A1* | 11/2018 | Pandey | H04L 63/08 |

OTHER PUBLICATIONS

"Access Tokens—Facebook Login" accessed at https://developers.facebook.com/docs/facebook-login/access-tokens/ printed on Dec. 1, 2016.

White Paper "A How-to Guide to OAuth & API Security with CA Layer 7: Make OAuth Implementation Simple for Your Organization" Feb. 2014, published by CA Technologies.

\* cited by examiner

TWO-TOKEN BASED AUTHENTICATED SESSION MANAGEMENT

BACKGROUND

In the era of the Internet of Things, and with the proliferation of many different types of human interface devices, users may desire to maintain a session for a long period of time. However, if a session remains open for a period of time without receiving any communications from a particular device, to promote security and efficient use of resources the hosted service provider may desire to end the session. The user will then be required to log in to the hosted service again and begin a new session. This can lead to an undesirable user experience.

In the prior art, to maintain a stateful session using the Hypertext Transfer Protocol (HTTP), authentication cookies are commonly used. Authentication cookies are used by web servers to determine whether the user of a particular device is logged in to a session or not, and to identify the account with which the user has been logged in.

Because an authentication cookie is essentially just a session identifier, there is a risk that a malicious entity can attempt to impersonate a legitimate user's request by stealing the user's authentication cookie. From the web server's point of view, a malicious entity may appear to be the legitimate user because the malicious entity has the legitimate user's cookie.

To mitigate this risk, the web server may set a shorter cookie lifetime, so as to periodically invalidate potentially leaked authentication cookies. However, this can lead to a less than desirable user experience, as end users may be asked to authenticate again on a frequent basis, even when using a private device. In addition, a cookie is not useful for maintaining a session across multiple devices.

This document describes methods and systems for securely maintaining a user session for a long period of time, and in some embodiments across multiple hosted services and/or multiple devices.

SUMMARY

In an embodiment, a system maintains a web session for a user across multiple web resources and/or devices using a two-token model. A user agent of a first electronic device that is being used by a user will transmit a first authentication request to a login endpoint. The first authentication request will include a request to access a first web resource and includes a login credential for the user at the first web resource. The system will identify a grant token. The user agent will receive a first access token in response to the first authentication request. The first access token will have a life that is shorter than a life of the grant token, such that the grant token is relatively long-lived and the first access token is relatively short-lived. The user agent will store the first access token in a memory, and it will use the first access token to access the first web resource and establish a web session. When the first access token expires or is about to expire, the user agent will transmit a re-authentication request to a re-authentication endpoint. The user agent will then receive a second access token from the re-authentication endpoint. The second access token will also have life that is shorter than the life of the grant token. The user agent will then use the second access token to access the first web resource and maintain the web session.

In some embodiments, when using the second access token to maintain the web session, the user agent may send the second access token to the first web resource.

Optionally, the user agent may receive a user's command to terminate the web session. If so, it will remove the grant token from the first electronic device in response to the command and send a logout command to an endpoint device that is associated with the first web resource. The logout command may include a command for the re-authentication endpoint or a user profile server to delete the grant token.

In some embodiments, the re-authentication request may include a header having an authentication field in which the grant token is placed and/or a hash that is derived from the grant token.

In some embodiments, the grant token may include a user identifier and a timestamp indicating a time at which the grant token was created. The login endpoint also may generate a web token that includes the grant token and one or more of the following fields: an address of the re-authentication endpoint; an identifier of the first access token; an expiration time of the first access token; or an address from which an image of the user may be returned.

In some embodiments, a second user agent that is being used by the user may generate a second authentication request to access the first web resource. The second user agent will transmit the second authentication request with the grant token to an endpoint device and in response, receive a third access token in response to the second authentication request. The second user agent may then use the third access token to access the first web resource and maintain the web session.

In some embodiments, the first user agent may generate a second authentication request that includes a request to access a second web resource. The first user agent may transmit the second authentication request with the grant token to an endpoint device, receive a third access token in response to the second authentication request, and use the third access token to access the second web resource and maintain the web session.

In other embodiments, a second user agent that is being used by the user may generate a second authentication request that includes a request to access a second web resource, and it may include the grant token in the second authentication request. If so, the second user agent may receive a third access token in response to the second authentication request, and it may use the third access token to access the second web resource and maintain the web session.

In some embodiments, the first electronic device may discover a second electronic device that is in a communication range of the first electronic device and determine that the second electronic device also includes a virtual session manager that includes the grant token. If so, then when transmitting the first authentication request to login endpoint, the system may do so via the virtual session manager of the second electronic device so that the second electronic device can present the grant token to the re-authentication endpoint. Then, when receiving the first access token in response to the first authentication request, the system may do so via the virtual session manager after the virtual session manager received the first access token from the login endpoint. Optionally, in this embodiment identifying the grant token may be done by the virtual session manager of the second electronic device and not by the first electronic device. In addition, establishing the web session may be done without the first electronic device receiving any access to the grant token. Further, when the user agent of the first electronic device receives the first access token from the virtual session manager, it also may receive one or more rules from the virtual session manager; if so, it may apply the rules when accessing the first web resource. As another option, when receiving the first access token from the virtual session manager, the system also may receive a history from the virtual session manager, wherein the history includes one or more parameters associated with the user's prior use of the first web resource. If so, then when accessing the first web resource, the user agent of the first electronic device may automatically send the parameters to the first web resource to maintain or automatically reconnect to the web session so that the web session is uninterrupted without manually entering the parameters.

The embodiments described above also may be used to manage a session across multiple devices or web resources. For example, a system may maintain a web session for a user by one or more endpoint devices receiving, from a user agent of a first electronic device based on an action of a user of the first electronic device, a first authentication request to access a first web resource with which the one or more endpoint devices are associated. The first authentication request will include a login credential for the user at the first web resource. The endpoint device(s) will generate a first access token in response to the first authentication request. The first access token will authorize the user agent to access the first web resource. The endpoint device(s) will also generate a grant token so that the grant token has a life that is longer than a life of the first access token and thus the grant token is relatively long-lived and the first access token is relatively short-lived. The endpoint device(s) will establish a web session for the user, and transmit the first access token to the first electronic device. When the first access token has expired or is about to expire, the endpoint device(s) will receive a re-authentication request that includes the grant token and determine whether the grant token is valid. If the grant token is invalid, the endpoint device(s) will deny the re-authentication request. If the grant token is valid, the endpoint device(s) will send a second access token to the first electronic device. The first access token will authorize the user agent to access the first web resource and thus maintain the web session.

Optionally, when the endpoint device(s) determine whether the grant token is valid, the endpoint device(s) may do so by requiring one or more of the following as a condition of determining that the grant token is valid: (i) determining that the user has not changed an access credential since a most recent prior authentication request; or (ii) determining that no known account associated with the user has been flagged as having encountered suspicious activity that may indicate that the account has been compromised.

Optionally, the endpoint device(s) may receive a logout command from the user, determine that the logout command includes an identifier for the grant token, delete or cause the first web resource to delete the grant token from a memory, and cause the first web resource to clear the first access token so that the first access token can no longer be used to access the first web resource.

Optionally, before generating the grant token, the endpoint device(s) may confirm that the user agent supports a two-token model by determining whether a header of the first access request includes a two-token model identifier.

Optionally, the endpoint device(s) may generate a session record that includes the grant token, a time at which the grant token was created, and an identifier of the user agent. The endpoint devices may maintain the session record in a memory until the endpoint device(s): (a) receive a logout command from the user; (b) determine that more than a threshold number of sessions are currently active for the user; or (c) determine that an account associated with the user has been flagged as having encountered suspicious activity that may indicate that the account has been compromised.

Optionally, in response to receiving the first authentication request, the endpoint device(s) may determine that the user has a plurality of available login credentials and/or a plurality of active sessions (grant tokens) for the first web resource. The endpoint device(s) may prompt or cause the first electronic device to prompt the user to select an account or session from a set of candidate accounts or sessions, wherein each of the candidate accounts is associated with one of the available login credentials. The endpoint device(s) (or other device) may receive the user's selection of one of the candidate accounts or session in response to the prompt and use the login credential for the selected candidate account as the login credential for the first access request, and/or it may use the grant token for the selected session as the grant token for the first access request.

Optionally, the endpoint device(s) may generate a web token that includes the grant token and one or more of the following fields: an address of a re-authentication endpoint; an identifier of the first access token; an expiration time of the first access token; and/or an address from which an image of the user may be returned.

Optionally, the endpoint device(s) may receive, from a second user agent that is being used by the user, a second authentication request to access the first web resource. The endpoint device(s) may determine that the second authentication request includes the grant token, and confirming that the grant token is valid. The endpoint device(s) may generate a third access token in response to the second authentication request, wherein the third access token will permit the second user agent to access the first web resource and maintain the web session. The endpoint device(s) may transmit the third access token to an electronic device that includes the second user agent.

Optionally, the endpoint device(s) may receive, from the first user agent, a second authentication request to access a second web resource, determine that the second authentication request includes the grant token, and confirm whether the grant token is valid. If the grant token is valid, the endpoint device(s) may generate a third access token in response to the second authentication request, wherein the third access token will permit the first user agent to access the second web resource and maintain the web session. The endpoint device(s) may transmit the third access token to the first electronic device.

Optionally, the endpoint device(s) may receive, from a second user agent that is being used by the user, a second authentication request to access a second web resource. The endpoint device(s) may determine that the second authentication request includes the grant token and confirm whether the grant token is valid. If the grant token is valid, the endpoint device(s) may generate a third access token in response to the second authentication request. The third access token will permit the second user agent to access the second web resource and maintain the web session. The endpoint device(s) will transmit the third access token to an electronic device that includes the second user agent.

Also, if the endpoint device(s) determine that the first authentication request is indirectly received from the user agent of the first electronic device via a second electronic device that includes a virtual session manager, then after generating the grant token the endpoint device(s) may transmit the grant token to the second electronic device but not to the first electronic device.

DETAILED DESCRIPTION

Figure 1:
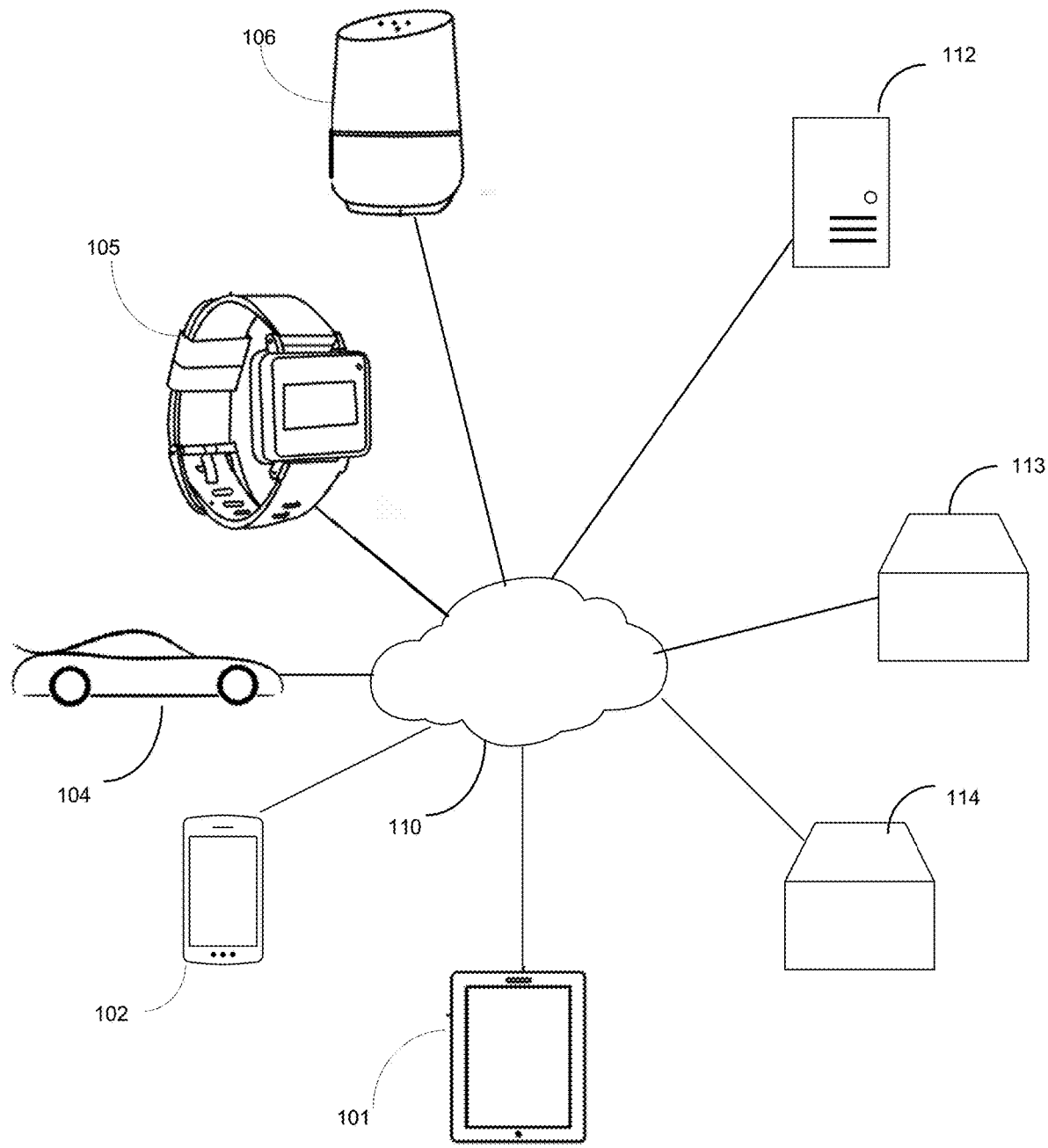
FIG. 1 illustrates an example of the various entities that make up a system including various hosted services, users, and devices.

Terminology that is relevant to this disclosure includes:

The singular forms "a," "an," and "the" include plural references unless the context clearly dictates otherwise. Also, the term "comprising" (or "comprise") means "including (or include), but not limited to." The relative terms "long" and "short" are intended to be relative measurements with respect to each other, in that the measurement value of an item that is designated as "long" will be relatively longer than the measurement value of a corresponding item that is designated as "short." Unless defined otherwise, all technical and scientific terms used in this document have the same meanings as commonly understood by one of ordinary skill in the art.

An "access token" is a short-lived token that represents a user's approval for a user agent to access a web server on behalf of a user. An authentication cookie is an example of an access token. A cookie is a small piece of data that is sent by a website and stored in the user's web browser while the user is using the browser to access one or more websites.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers (such as those used in hosted services), mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "endpoint device" is a physical or virtual device or a group of physical or virtual devices that serve as an entry point for event-driven background processing for the grant of access to one or more web resources in a communication network. For brevity, this document may refer to an endpoint device simply as an "endpoint." Examples of endpoints discussed in this document include a login endpoint and a re-authentication endpoint.

A "grant token" is a long-lived authentication token that represents a user's approval for one or more user agents to access one or more web servers on behalf of the user. A grant token may be stateful (in which case the grant token has a record in a server-side data storage facility) or stateless (meaning that no server-side record exists for the grant token).

The term "hosted service" refers to a system that includes one or more electronic devices that will remotely provide or process data or execute programming applications for one or more client electronic devices. A hosted service may be provided in the form of software as a service, platform as a service, or infrastructure as a service. A hosted service may include servers and infrastructure elements (such as operating systems and communication systems) that are dedicated to each client, or it may provide services to multiple clients with shared servers and other resources. Examples of hosted services include web services, email services, other messaging services, cloud data storage services, multimedia content services, social media services and other types of hosted services. In some embodiments, a hosted service may make a group of such services available to a user with a common login and a single user account.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as sections within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices collectively perform a process.

A "user agent" refers to a software agent that is configured to act on behalf of a user of an electronic device to access a hosted service. Examples of user agents include browsers and native applications such as email or messaging clients, streaming media service applications, and cloud storage service applications.

A "virtual session manager" is a software application that is configured to run on an electronic device and manage the device's ability to access one or more remote web services via one or more web sessions.

A "web resource" is a remote service that is available from a hosted service in a communication network, such as a website, a cloud-based storage service, or a cloud-based electronic messaging service.

The terms "web session," "virtual session" and "session" synonymously refer to a sequence of request-response transactions to one or more web resources in a communication network that are initiated by a single user. Examples include HTTP request-response transactions in an HTTP session. The requests in a session will be spaced apart in time such that the time between requests does not trigger an inactivity threshold in which the user is required to log into the user's account again to continue accessing the web resource.

A "web token" is a token representing claims to be transferred between two entities.

FIG. 1 illustrates various components of systems and relationships between electronic devices that will be discussed in this document. Any number of hosted services 113, 114 are available to provide web resources to client electronic devices via a communication network 110. The communication network 110 may be a local area network (LAN), a wide area network (WAN), a mobile or cellular communication network, an extranet, an intranet, the Internet and/or combinations of any of these networks or other networks. Examples of client electronic devices include a smartphone 102, a computing device 103 such as the tablet computing device shown, on-board vehicle devices 104 such as in-dashboard entertainment and navigation systems, wearable electronic devices such as a smart watch 105, and connected Internet of Things devices such as a home voice assistant 106.

In certain embodiments, one or more endpoint devices 112 may be available to receive authentication requests from the electronic devices and issue authentication tokens to the electronic devices using procedures such as those discussed below.

Figure 2:
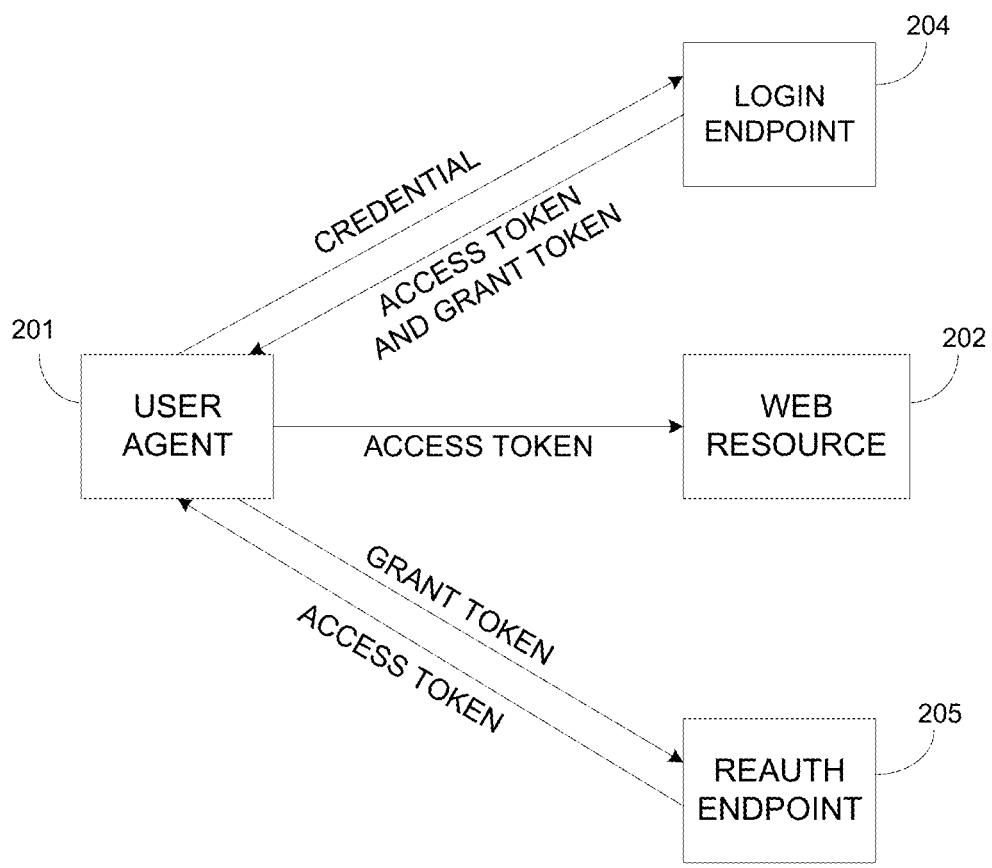
FIG. 2 illustrates an example of a two-token authentication model.

FIG. 2 provides a high-level overview of a method of authenticated session management using a two-token model. In the two-token model, two authentication tokens are used to manage a session between a user agent 201 of an electronic device and a web resource 202. When the user agent 201 issues an authentication request for the web resource 202, it will present a credential to a login endpoint 204. If the credential is valid (i.e., if it permits the user agent to access the web resource), the login endpoint 204 will establish the session by issuing an access token and a grant token to the user agent 201. The user agent 201 will store the access token and the grant token in a memory of its associated electronic device. The user agent 201 can then present the access token to the web resource 202 in order to be granted access the web resource 202.

When the access token is expired or about to expire, the user agent 201 can send a re-authentication request to a re-authentication endpoint 205. The re-authentication endpoint 205 may be separate from the login endpoint 204 as shown, or the two endpoint devices may share one or more hardware elements. Upon validating of the re-authentication request, the re-authentication endpoint 205 will return a new access token to the user agent 201 so that the user agent 201 can maintain the session with the web resource 202.

The grant token represents a user's approval. The grant token has a relatively long life, and optionally an infinite lifetime. A user agent can present a grant token to obtain new authentication tokens. The grant token keeps the user's approval in the user agent for a relatively long time, unless the user or another entity revokes or invalidates it. In this way, the user does not need to authenticate again and again during that lifetime of the grant token. A grant token may include a timestamp representing its time of creation. The grant token also may include an identifier that the system can use to identify the user who is associated with the grant token (i.e., the recipient of the grant token). In addition, the grant token may include fields such as an address of the re-authentication endpoint, an identifier (such as a session cookie name) for the access token, an expiration time, and/or an address from which an image of the user may be returned.

The access token has a relatively short life (i.e., a shorter life than that of the grant token). This shorter life can limit the ability of such tokens to be misused if compromised. The access token may be presented to a web resource to gain access to the web resource. The grant token may not be used for that purpose.

Figure 3:
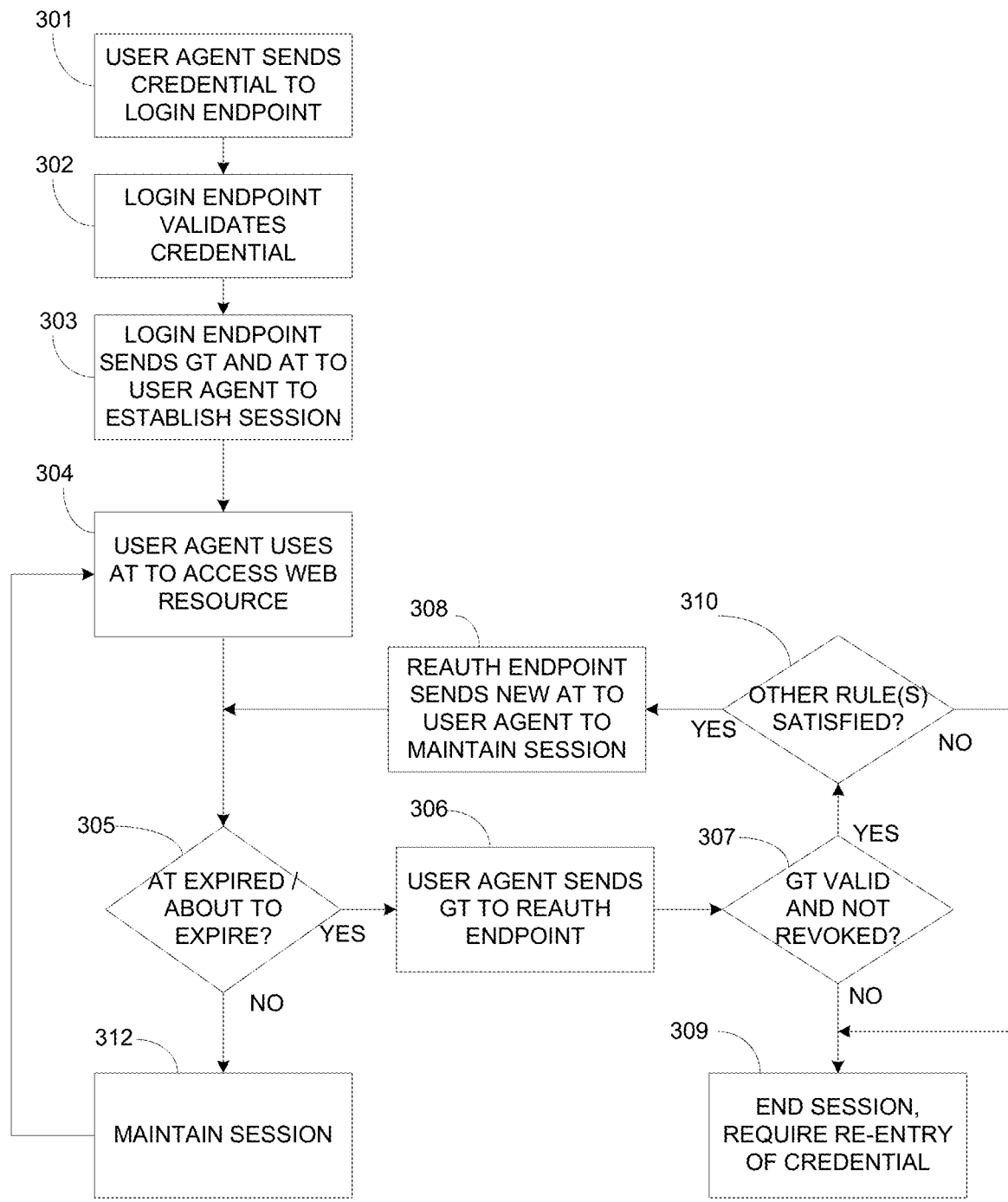
FIG. 3 is a flowchart that illustrates an example process of two-token authentication.

This process is further illustrated in the flow diagram of FIG. 3. In order to request access to a web resource, a user agent may transmit an authentication request to a login endpoint 301 by transmitting a credential to an address of the login endpoint. The credential can be any credential that the login endpoint can use validate the credential 302 and thus determine whether the user agent is authorized to access the web resource, such as a passphrase, a biometric identifier, a key or any other credential.

If the credential is valid (i.e., if it permits the user agent to access the web resource), the login endpoint will establish a session by transmitting an access token and a grant token to the user agent 303. In some embodiments, the login endpoint may establish the session as an authenticated HTTP session by returning an authentication cookie (whose value is the authentication token) in the set-cookie HTTP header. Other methods of issuing the tokens to the user agent may be employed. Optionally, when the login endpoint returns the grant token and access token to the user agent, the login endpoint also may transmit a uniform resource locator (URL) or other address of the re-authentication endpoint so that the user agent knows the address to which it must send a request for a new access token.

The user agent can then transmit the access token to the web resource 304. The web resource will give the user agent access to the web resource and thus maintain the session 312 so long as the access token is valid and has not expired.

When an access token has expired or is about to expire 305 (i.e., within a threshold period of time or other unit of measure from anticipated expiration), the user agent can send a re-authentication request 306 to the re-authentication endpoint to request a new access token. The re-authentication request may include the grant token, or it may include another token that is derived from the grant token. For example, instead of sending the actual grant token the user agent may send a hash-based message authentication code (HMAC) signed by the grant token to indicate that user agent owns the grant token. In some embodiments, the user agent may submit the re-authentication request as an XMLHttpRequest to the re-authentication endpoint, with the grant token in the "authorization" HTTP header.

Upon receipt of a re-authentication request from the user agent, the re-authentication endpoint will determine whether the grant token is valid and not revoked 307 using any suitable validation process such as a lookup table or access control list. If the grant token is valid and not revoked 307, the re-authentication endpoint may return a new access token to the user agent 308 so that the user agent can use the new access token to maintain the session. Otherwise, the re-authentication endpoint will not return a new access token, in which case the session will expire 309 when the original authentication token expires. For example, the re-authentication endpoint may return an error message in the HTTP response body. The user agent will then be required to present a credential again to the login endpoint or the re-authentication endpoint to maintain the session or establish a new session. Also, the user agent may then delete the grant token from its device's memory. The re-authentication endpoint may also send a "delete grant token" command to a logout endpoint or other server-side location where the grant token has been stored, optionally in association with the user's profile.

Optionally, as a condition returning a new access token, the re-authentication endpoint also may require that the user's profile data satisfies one or more additional rules 310. For example, the re-authentication endpoint may access a data storage facility with a profile for the user that is associated with the grant token, examine the data in the user's profile, and only return the access token if: (i) the user has not changed its credential since a most recent prior access request; and/or (ii) no known account associated with the user has been flagged as having encountered suspicious activity that may indicate that the account has been compromised. In this way, the re-authentication endpoint will ensure that the grant token is not issued if one or more significant events associated with the user's account have occurred, such as a login credential change or a potential security compromise. Other rules may require different conditions.

The system also may provide for the entry of logout commands, which will expire or revoke grant tokens. For example, a user interface of the first electronic device may permit the user to enter a command to terminate the session, in which case a command to revoke of the grant token will be sent to the re-authentication endpoint and/or a server that contains the user's profile. The user's electronic device also may delete the grant token in response to the command. The electronic device also may transmit a command to the re-authentication device and/or a logout endpoint to delete the grant token.

Figure 4:
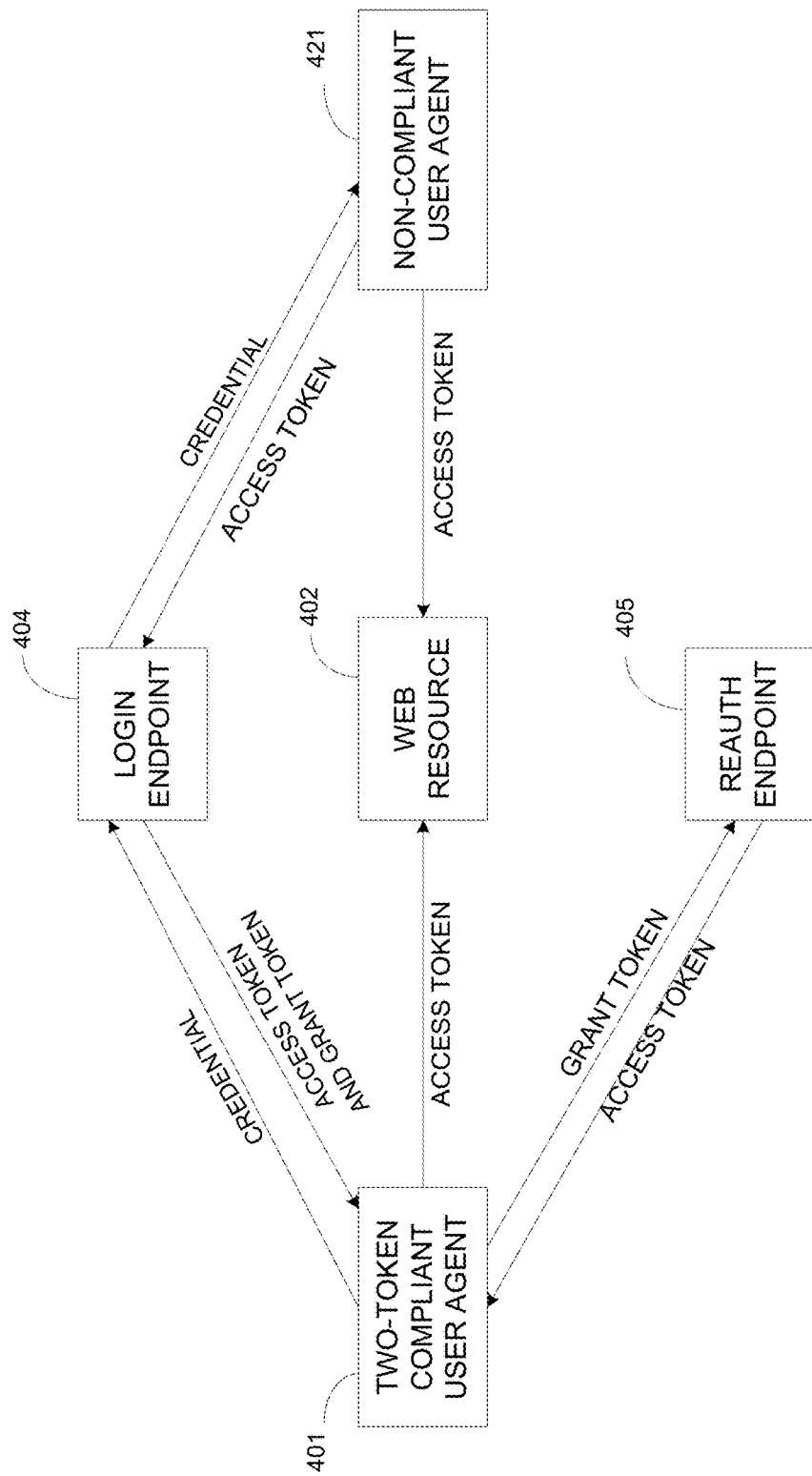
FIG. 4 illustrates how a system may implement a two-token model with a variety of user agents, some of which may not support the two-token model.

In various embodiments, the two-token model described above may use an access token format that matches that of a cookie in a single token model. In this way, if a particular user agent does not support a two-token model, the login endpoint may return only an access token to that user agent, or the user agent may receive a grant token but ignore it. FIG. 4 illustrates how a two-token model may be used with both two-token complaint user agents and user agents that do not have two-token model support capability. In FIG. 4, a web resource 402 may be available to various types of user agents, including a first user agent 401 that is programmed to support a two-token model and a second user agent 421 that does not have such programming and cannot support a two-token model. Each of the user agents 401, 421 can request access to the web resource by presenting their credentials to the login endpoint 404. When the login endpoint 404 receives an authentication request from a user agent, the login endpoint 404 will examine the authentication request to determine whether the user agent supports the two-token model. One way of doing this may be that a two-token model compliant user agent will self-identify that it is two-token model compliant in a header of the authentication request (such as an "Accept-Session-Management" HTTP header). If the login endpoint 404 determines that the user agent is two-token compliant, it will return both an access token and a grant token to that user agent 401. When the access token expires or is about to expire, the two-token compliant user agent 401 may then use the grant token to submit a re-authentication request to a re-authentication endpoint 405. If the login endpoint 404 determines that the user agent is not two-token compliant, it will return only an access token, but a not grant token, to that user agent 421. Each of the user agents 401, 421 may use their access tokens to access the web resource 402.

Grant tokens can be stored on the server side and enable a user agent to have multiple sessions active at any point in time. To enable this, any of the endpoints may create and store a session record for each grant token. The session record will include the grant token and information that can be used to distinguish that grant token's session from other sessions that are associated with the user agent, such as an identifier for the user account, a user agent identifier, time of creation, time of last access, and/or other data. The system also may generate and store data (such as web tokens) with additional data such as the address of the re-authentication endpoint, the name of the access token, an expiration time for the access token, a timestamp when the grant token was issued, an expiration time for the grant token, an email or other address for the user, a name or other identifier to display for the user, and/or an address from which the system may retrieve a digital image file that is associated with the user (such as user image).

When a user logs out of a particular session, the endpoint will delete the session record from its memory. A session record also may be deleted in response to an action by an administrator, or if one or more session termination rules have been identified. For example, the endpoint may automatically terminate a session if one or more security-related issues have been identified with the user's account. Examples of such issues include: (i) the occurrence of a credential change; (ii) or a per-user active session limit having been reached (i.e., that the user is logged into more than a threshold number of sessions at one time; or (iii) detection that multiple user agents associated with a single user are being used in disparate locations at the same time or within a time frame in which the user could not have been in all of the locations during the time frame.

In addition, the device endpoint(s) can provide a session manager user interface that displays all active grant tokens for a current user across a set of user agents. For example, a user (e.g., user1@example.com) who is logged into a website can visit the session manager web page, and view all grant tokens issued by the website in the name of user1@example.com. The session manager also may display additional information for each grant token such as device information, login time, or other details to help the user distinguish the grant tokens from each other. By browsing the session manager, the user may be alerted that he or she neglected to log out of a session on a particular device. Or, the user may be alerted that his or her account is being used on an unrecognized device. In either case, the session manager may enable the user to terminate a session by providing a user interface that will receive a termination command, in response to which the system will delete the grant token corresponding to that session.

Figure 5:
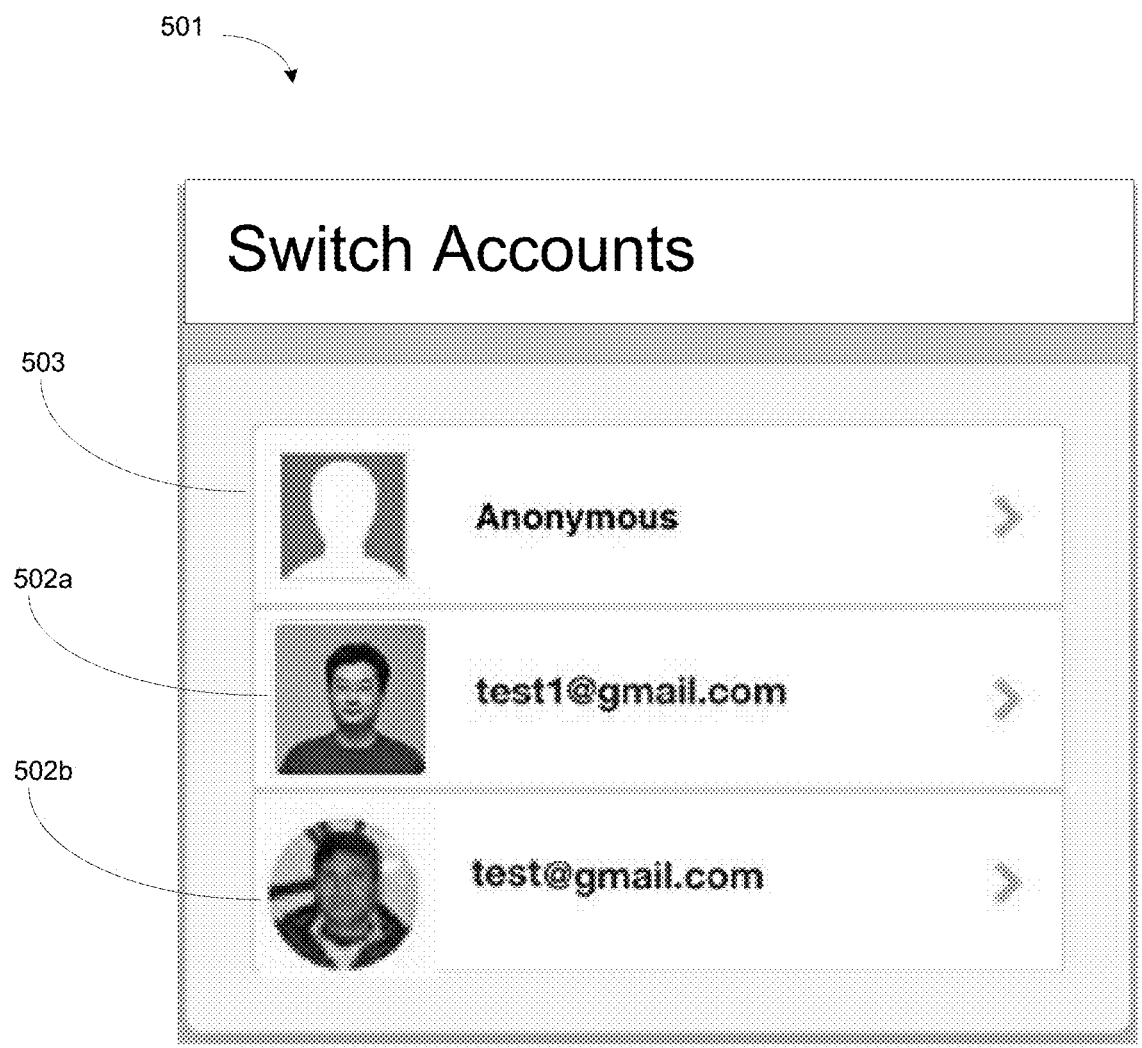
FIG. 5 illustrates an example account manager user interface.

The user agent or device may generate an account manager user interface that identifies accounts that are associated with the user agent, and that enables the user to select the connect to, or log out of, any of various accounts to create a new session or join an active session for each account. In some embodiments, each user account will be associated with a single grant token and a single session, although other configurations may be possible. FIG. 5 illustrates an account manager user interface 501, in which the user can select one of multiple accounts 502a, 502b that are associated with the user agent. Upon selection of an account, the session manager will identify or obtain the grant token for that account, and it will provide the user agent with the access token for the appropriate account. As shown, the account manager interface also displays various information about each account, such as an email address or user image for the user for the session. (As noted above, the grant token may include an address from which a user image may be returned.)

Optionally, one of the accounts available on the account manager user interface may be an anonymous account 503, in which case the system may not generate a grant token at all. With an anonymous account, the user may be given limited permissions to take certain actions (such as view posts on a website, but not create or reply to those posts).

The two-token model can help manage multiple accounts with a single user agent. Without a two-token model, to switch accounts the user would need to actively log out of a first account, and then log into a second account by entering his or her credentials for the second account. However, if the user agent stores grant tokens for each of various accounts, the user may not be required to log in when switching to a second account. Instead, when the account manager user interface receives a request to switch from a first account to a second account, the user agent can simply retrieve the grant token for the second account and use the grant token to obtain an access token for the web resource.

The two-token model also may be used to facilitate a single session across multiple web resources. For example, a user and/or a hosted service may provide a document generation service (such as a word processor) and a cloud file storage service as a common web resource, and thus may desire to treat the user's use of such services as a single session. If so, then the user's electronic device, or a different electronic device that the user is using, may include a second user agent. The second user agent may generate a second authentication request 602 to access the first web resource. The second user agent will receive access to the grant token 601, either by the first user agent or by an endpoint that contains the grant token. The second user agent will transmit 603 the second authentication request with its credential and the grant token to a re-authentication endpoint. The re-authentication endpoint will return 604, and the second user agent will receive, an access token in response to the second authentication request. The second user agent may use the received access token to access the web resource 605 and maintain the web session 612 until the access token expires. When the access token expires or is about to expire 606, the second user agent may access the re-authentication endpoint and request a new access token 607 using procedures such as those discussed above in the context of FIG. 3.

As another example of how the two-token model can facilitate a single session across multiple web resources, a service provider may offer web resources in different top-level domains (TLDs) for various reasons, such as: (1) offering web resources that are customized for particular countries (and thus that use the TLDs for those countries); (2) to use various different brands (with the relevant brand name in the TLD); (3) when transitioning from one TLD to another TLD (as in the case of a corporate acquisition); and/or (4) for other for other purposes. The session cookie for one of these web properties may be invisible to the others, since they are in different TLDs, and because they may involve separate (and sometimes incompatible) session management systems. The two-token model may be used facilitate the integration of these web resources by issuing a common grant token that is acceptable to each of the re-authentication endpoints on the various TLDs.

Figure 6:
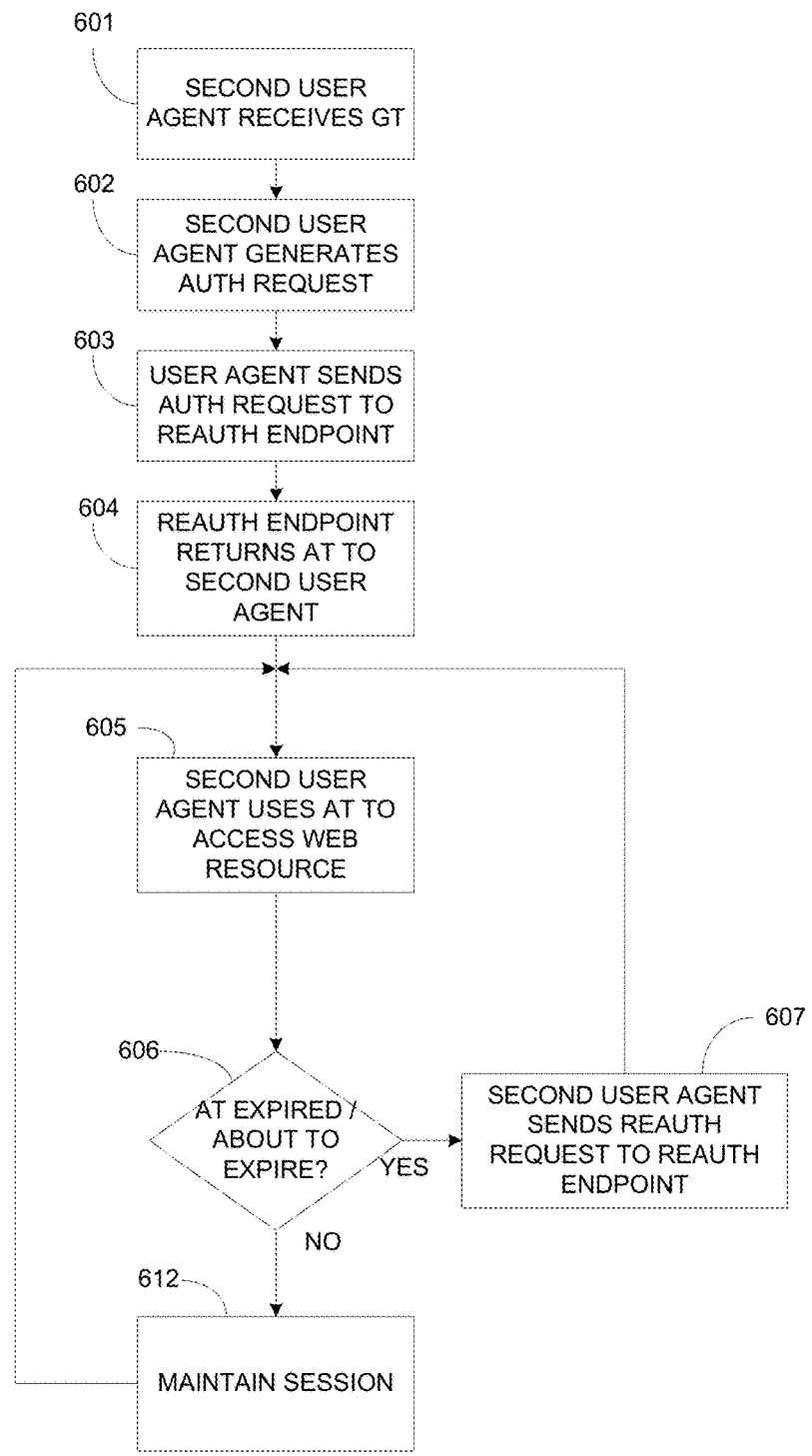
FIG. 6 is a flowchart that illustrates an example process of two-token validation with multiple user agents.

Similarly, a user and/or a hosted service may provide a document generation service (such as a word processor) and a cloud file storage service as separate web resources, but still may desire to treat the user's use of such services as a single session. If so, then the first user agent may generate a second authentication request that comprises a request to access a second web resource. The first user agent may transmit the second authentication request with the grant token to the login endpoint and receive an additional access token in response to the second authentication request. The first login endpoint may use the new access token to access the second web resource and maintain the web session. In addition, this process may be used with a second user agent, in which the process of FIG. 6 will apply, but with an access token for the second web resource instead of the first web resource.

In some embodiments, to maintain a session across multiple devices, a user agent of the user's first electronic device may not hold a grant token, but instead the grant token may be held by a second electronic device that is in a communication range of the first electronic device. The second electronic device will include a virtual session manager that manages the session across multiple electronic devices. Only client devices with a virtual session manager will hold the grant token; other client devices will not be given the grant token. In this way, dissemination of the grant token is limited to certain client devices that are have virtual session manager functionality. This will be described in more detail below.

The two-token model can provide several technical advantages, including better security by decreasing the time window in which access tokens must remain valid (and thus can be leaked), a better user experience by requiring the user to re-enter credentials less frequently, a standard method of terminating sessions when account security issues are detected, and operation in a multiple-device environment.

The multiple device environment is now described with reference back to FIG. 1, in which any number of client electronic devices can serve as human interface devices (HIDs) in a multiple-HID environment. Examples of client electronic devices shown include a smartphone 102, a tablet computing device 103, an on-board vehicle device 104, wearable electronic devices such as a smart watch 105, and a home voice assistant 106 or other smart home device. One or more endpoint devices 112 may be available to receive authentication requests from the client electronic devices and issue authentication tokens to the electronic devices to establish and maintain sessions across any number of hosted services 113, 114 via a communication network 110.

Figure 7:
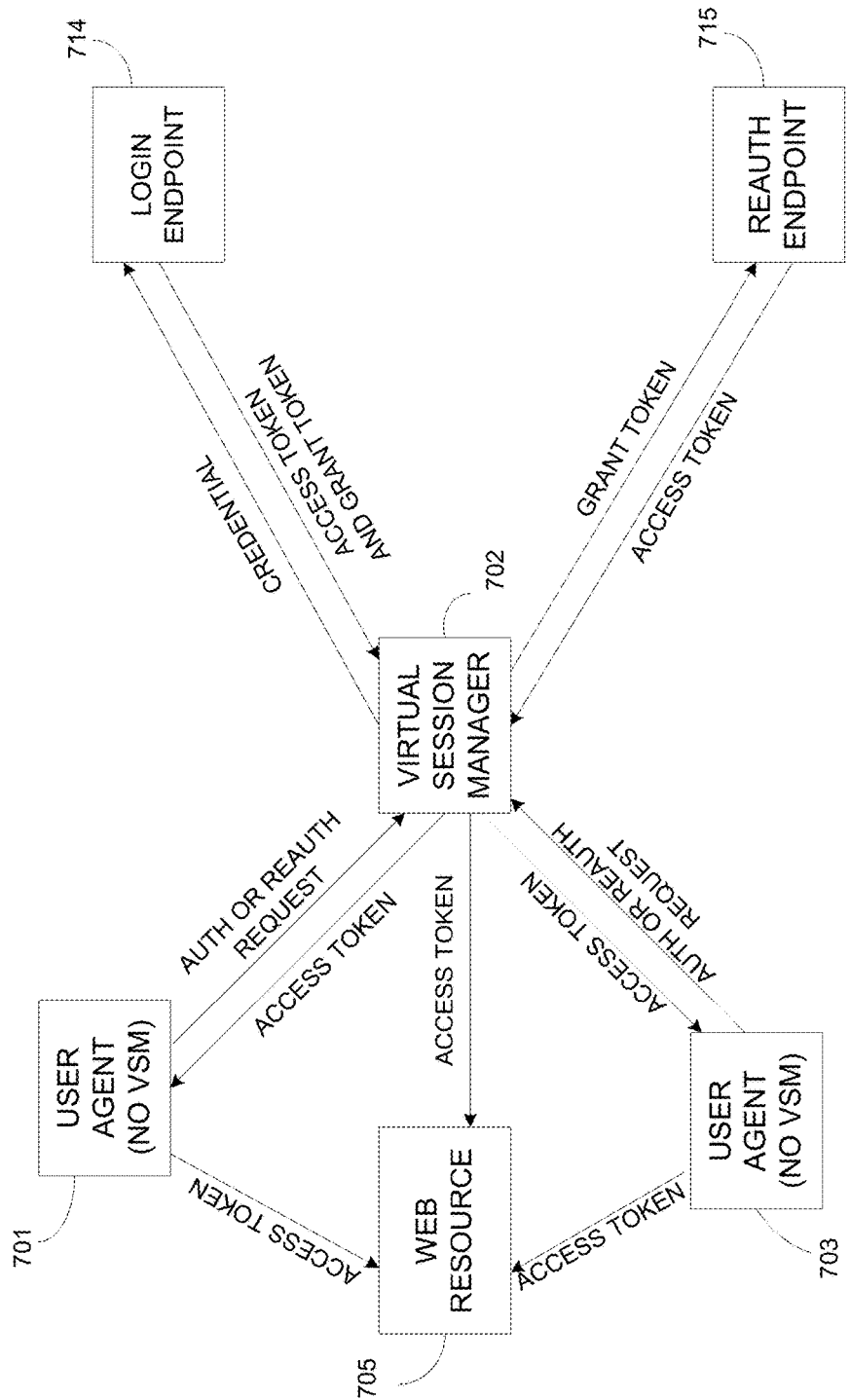
FIG. 7 illustrates how a virtual session manager may manage authentication of multiple devices and allow the devices to share a single session.

In this embodiment, at least one—but not all—of the client electronic devices will include a virtual session manager. A virtual session manager is an application that stores a grant token for a session and facilitates access to the session by other client electronic devices that are not given access to the grant token. FIG. 7 illustrates how the virtual session manager may be implemented. A first client electronic device 701 that does not include a virtual session manager may discover that a second client electronic device 702 with a virtual session manager is in a communication range of the first client electronic device 701. The communication and transmissions between the devices may use any suitable communication protocol, such as Bluetooth, radio frequency identification, Wi-Fi, another short-range or near-field communication protocol, or the like. Any suitable discovery technique may be used, such as Bluetooth service delivery platform (SDP), Universal Plug and Play (UPnP), simple service discovery protocol (SSDP), or operating system-level services. If the first electronic device 701 discovers one or more devices with a virtual session manager, the user agent of the first electronic device 701 may cause a user interface to output identifiers associated with each discovered device so that the user can select the virtual session manager to which the first electronic device 701 will connect.

A virtual session manager of the second electronic device 702 may establish a web session with the web resource 705 using a process such as that described above in the context of FIGS. 2 and 3. In particular, when a virtual session manager of the second electronic device 702 wishes to establish a session with a web resource 705, it will send an authentication request to the login endpoint 714. The authentication request is a request to access the web resource 705 and will include a login credential for the user of the second electronic device 702. If the credential is valid, the login endpoint 714 will return a grant token and an access token to the virtual session manager. The virtual session manager of the second electronic device will store the grant token in the second electronic device 702. If the virtual session manager is also a user agent or if the second electronic device also includes a user agent, the second electronic device also may use the access token to access the web resource 705. When the access token has expired or is about to expire, the virtual session manager of the second electronic device 702 may send a re-authentication request to a re-authentication endpoint 715. The virtual session manager may receive the re-authentication request from the first electronic device, via a user interface of the second electronic device, or automatically when the virtual session manager generates it because it detects the expiration or pending expiration. The re-authentication endpoint 715 will review the request and return a new access token to the second electronic device 702 using methods such as those previously described. Any or all of the features of the grant token, access token, authentication request and re-authentication request that were described above in previous embodiments also may apply in this embodiment.

After any of the client devices without a virtual session manager discovers and establishes a communication link with the second electronic device 702, its user agent may send an authentication request to the second electronic device. For example, a user agent of the first electronic device 701 may send an authentication request to access to the web resource by sending the request to the second electronic device. The authentication request may be a request to start a new session with the web resource 705, or it may be a request to join the session that the second electronic device 702 has already established with the web resource 702. If the request is for a new session, the virtual session manager of the second electronic device 702 will send the authentication request with a login credential to the login endpoint 714, and it will receive a grant token and access token from the login endpoint 714. If the request is to join an existing session that the user agent of the first electronic device 701 had not previously joined, or if the request is to maintain an existing session that the user agent of the first electronic device 701 previously joined but for which the user agent's credential expired or is about to expire, the virtual session manager will send the grant token for that session to the re-authentication endpoint 715 and obtain a new access token for the user agent from the re-authentication endpoint 715.

In any of these situations, after receiving the access token from the relevant endpoint, the virtual session manager will send the access token to the first electronic device 701. The user agent of the first electronic device 701 can then save the access token and present it to the web resource 705. The second electronic device 702 will retain the grant token for the session and will not share it with the first electronic device 701.

A third electronic device 703 may also join the session with the web resource 705 using procedures matching those described above. In particular, the third electronic device 703 will send an authentication request for the session to the second electronic device 702. The virtual session manager of the second electronic device 702 will then send the grant token for the session to the re-authentication endpoint 715 to obtain an access token that the user agent of the third electronic device 703 can use to access the web resource 705 and join the session. As with the second electronic device 702, the third electronic device 703 will also not receive the grant token.

In any of these situations, when it receives an authentication request, the virtual session manager may discover that it is managing multiple sessions for the first web resource. If so, then the virtual session manager may cause a user interface of its electronic device to output the identifiers for each of the virtual sessions to that the user can choose one of the virtual sessions to join, as discussed above and shown in FIG. 5. When the user selects one of the sessions, the virtual session manager will send the authentication request to the applicable endpoint device with the appropriate grant token that applies to the selected session. Alternatively, the user may decline to join an existing session but instead may wish to start a new session. If so, the virtual session manager may obtain a new grant token for the new session and store the new grant token in its memory without sharing the new grant token with the first electronic device. If the user chooses a new session, the virtual session manager may require the user to enter a credential into the second electronic device before it will permit the user to start a new session, and the virtual session manager may only transmit the new session request to the endpoint if it confirms that the credential authorizes the user to access the web resource (using credential verification procedures such as those described above).

The virtual session manager may store a history that includes one or more parameters associated with the user's previous use of the web resource. These parameters can include last page visited on a website, a timestamp in a video or audio stream at which a user was last presented a streaming media file, or other parameters. The parameters may be those that existed when the virtual session manager last requested an access token for any of the devices' user agents. When sending an access token to a client device, the virtual session manager may also send any of these parameters to the client device so that the user agent of that client device can maintain or reconnect to a virtual session in an uninterrupted manner without having to re-enter the parameters.

The virtual session manager may enable a smooth transition between human interface devices in a single session. In addition, multiple devices can share and participate in the same web session. An untrusted device also may be given short-term access to a session by receiving a short-lived access token, but not be given any access to a long-lived grant token.

The virtual session manager also may cause the second electronic device to output a user interface by which the user may manage various aspects of a session. For example, the virtual session manager may enable a user to command the virtual session manager to do any or all of the following:

(i) disable the virtual session, in which case the virtual session manager will no longer obtain new or updated access tokens for that session so that future re-authentication requests for that session will not be granted, and optionally also sending the applicable endpoint device(s) a request to revoke the first access token, and optionally retaining the session's grant token for some period of time in case a user requests the virtual session manager to re-able the session;

(ii) re-enable a disabled virtual session, in which case the virtual session manager will resume requesting and granting new and updated access tokens for the previously disabled virtual session;

(iii) re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and use the alternate access token to connect to the alternate virtual session;

(iv) delete the virtual session, in which case the virtual session manager will delete the grant token for the virtual session; or (v) remove the first electronic device, in which case the virtual session manager will disable the first access token and prevent the first electronic devices' user agent from receiving additional access tokens until the virtual session manager receives a valid authentication credential.

The virtual session manager also may create and store a device record for each user agent that uses the virtual session manager to join a session. The device record may include an identifier for the user agent and/or its device, session parameters for that user agent (as described above), a timestamp for when the user agent joined the session, and/or other data. In addition, the virtual session manager may cause the client device on which it runs to output a user interface by which a user may edit one or more attributes of each connected user agent, such as by giving each user agent an alias, designating the user agent as trusted or untrusted, or other attributes.

With any of the embodiments described above, the virtual session manager can create or serve as a virtual identity wallet and/or password manager for a user. The user can use the virtual session manager to extend his or her identity to multiple devices on a short-term basis without having to enter passwords on each device, and manage each device's ability to use a session, while only granting long-term access capability to a single trusted device (or a select group of trusted devices). This can give an end user more efficient control over the access privileges that he or she wishes to grant to multiple devices in a connected environment.

In some embodiments, the virtual session manager may expire a particular user agent's access token if the user agent experiences an action that is outside of a scope of a trusted environment. For example, if the virtual session manager cannot detect the presence of the user agent's device using discovery protocols such as those described above, this may mean that the device has exited a trusted environment such as a known home or office. If so, the virtual session manager may expire the user agent's access token until it can re-discover the user agent's device. On the other hand, when a user agent's device enters a known trusted environment, such as a home or office, it may automatically connect to the virtual session manager and join a session. The devices may know that they are in a trusted environment based on finding known GPS location data, a known Wi-Fi network identifier, or other suitable parameters.

In some embodiments, systems that employ virtual session managers may use stateful grant tokens, meaning that there will be a server-side record of each grant token issued.

In some embodiments, in the two-token model and/or virtual session manger environments, a web resource, user agent and/or virtual session manager may require proof demonstrating that a user is actually present as a condition of granting the user agent access to the web resource and/or maintaining such access after a threshold period of time (such as a time of inactivity). If so, then the user agent may require a user presence token before it will send an access request to the web resource, or the web resource may require a user presence token before it will grant access, or the virtual session manager may require verification of user presence before it will issue an access token to the user agent. If so, then the user agent and/or virtual session manager may require some additional user action to provide second-factor authentication that will serve to confirm the user's actual presence. The additional user action may be, for example, speaking a passphrase, entering a personal identification number, applying a predetermined gesture sequence to a touchscreen, or doing any other action that can be verified by the user agent or the virtual session manager.

The system may require the user action to be performed on the first electronic device, on the device that includes the virtual session manager, or on a different device. For example, after a user presence token has expired the virtual session manager may require the user to activate an "approve" button on a user interface of its electronic device. In addition to the user presence action, the system may require that the device with the user agent and the device that has the virtual session manager be able to detect each other's presence within a communication range, such as by a near-field communication protocol.

If the user agent or virtual session manager can confirm the user action matches an expected action, and optionally of the devices can detect each other's presence, it will issue a user presence token. The user presence token will be relatively short-lived in that it will have a life that is no longer than that of the applicable access token. Or, it may have a life that is based not on time but based on number of uses, such as a single use. The user agent may include the user presence token when it transmits the access token to the web resource.

The virtual session manager also may impose one or more rules on a session based on one or more detected parameters. For example, the virtual session manager may impose a rule requiring that its device's user interface output a prompt for the user to approve any request from another device to connect to a session. The virtual session manager may then only obtain and forward an access token if and after the user provides such confirmation. This rule may apply to all authentication and re-authentication requests from any device. Alternatively, to improve user experience, the virtual session manager may apply the user approval only the first time that a device connects, only once during a threshold period of time, or not at all, so long as one or more additional rules apply, such as:

if the request is from a trusted device and the target web resource is categorized (in a data set that is accessible to the virtual session manager) as a web resource that is a low security resource (such as a public news website that typically requires no user credentials), then the virtual session manager may approve the request with no user interaction required on the virtual session manager's device;

if the request is to access a web resource that is categorized as a high security resource (such as a financial institution account website) then the virtual session manager may require user confirmation of approval with each request, or with each new request after a threshold period of time has passed;

if the request is to access a web resource that is a mail server, then the virtual session manager may select a virtual session associated with the user's work mail account if the second electronic device (or another detected proximate device) is known to be a work computing device, otherwise the virtual session manager may connect the user agent to a virtual session for the user's personal email account;

if the request is to access a web resource that is only to be accessed by the user during certain time frame (such as normal hours of employment), then the virtual session manager may obtain and forward the access token only if the current time is within that time frame.

The virtual session manager also may include a settings feature that enables a user to define rules such as those listed above and/or other rules.

Figure 8:
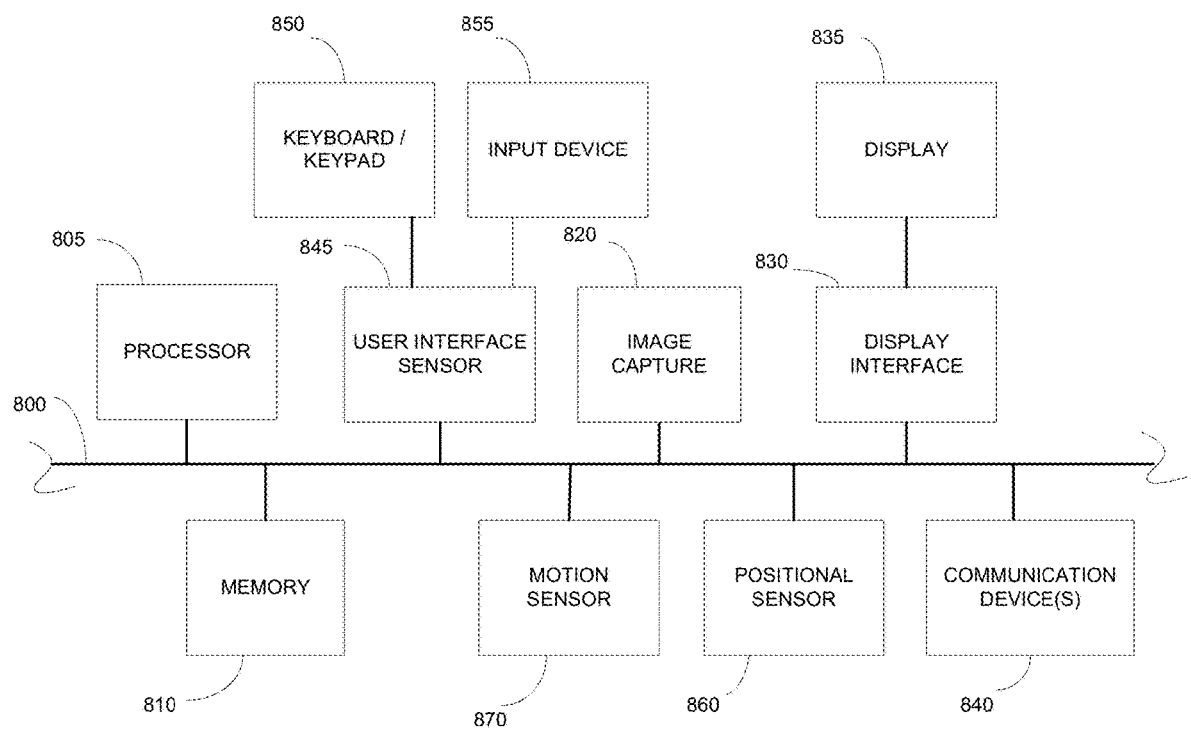
FIG. 8 is a block diagram showing example hardware components that may be included in various devices of the system, such as in a user electronic device, a hosted service or an endpoint device.

FIG. 8 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 810 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 820 such as a digital camera or video camera. A positional sensor 860 and/or motion sensor 870 may be included to detect position and movement of the device. Examples of motion sensors 870 include gyroscopes or accelerometers. Examples of positional sensors 860 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of maintaining a web session for a user:
by a first user agent of a first electronic device that is being used by a user, the first user agent being a first software application:
transmitting a first authentication request to a login endpoint of a service provider, wherein the first authentication request comprises a request to access a first web resource and includes a login credential for the user at the first web resource;
receiving, from the login endpoint, a first access token and a grant token in response to the first authentication request, wherein the first access token has a life that is shorter than a life of the grant token such that the grant token is relatively long-lived and the first access token is relatively short-lived;
receiving, from the login endpoint further in response to the first authentication request, addresses of a plurality of re-authentication endpoints, wherein each of the plurality of re-authentication endpoints serves a respective top-level domain (TLD) of the service provider, the plurality of re-authentication endpoints includes a first re-authentication endpoint serving a first TLD of the first web resource and a second re-authentication endpoint serving a second TLD of a second web resource, and wherein the login endpoint is different from the plurality of re-authentication endpoints;
storing the first access token in a memory;
using the first access token to access the first web resource and establish a web session;
when the first access token expires or is about to expire, transmitting a re-authentication request to the first re-authentication endpoint serving the first TLD, the re-authentication request including the grant token;
receiving a second access token in response to the re-authentication request from the first re-authentication endpoint, wherein the second access token has a life that is shorter than the life of the grant token;
using the second access token to access the first web resource and maintain the web session;
generating a second authentication request that comprises a request to access the second web resource on the second TLD, the second authentication request including the grant token;
transmitting the second authentication request to the second re-authentication endpoint serving the second TLD;
receiving, from the second re-authentication endpoint, a third access token in response to the second authentication request; and
using the third access token to access the second web resource and maintain the web session.

2. The method of claim 1, wherein using the second access token to maintain the web session comprises sending the second access token to the first web resource.

3. The method of claim 1 further comprising, by the first user agent of the first electronic device:
receiving, from the user, a command to terminate the web session;
removing the grant token from the first electronic device in response to the command; and
sending a logout command to an endpoint device that is associated with the first web resource.

4. The method of claim 3, wherein the logout command comprises a command for the first re-authentication endpoint or a user profile server to delete the grant token.

5. The method of claim 1, wherein transmitting the re-authentication request comprises transmitting a request that comprises:
    a header having an authentication field in which the grant token is placed; or
    a hash that is derived from the grant token.

6. The method of claim 1, wherein the grant token includes a user identifier and a timestamp indicating a time at which the grant token was created.

7. The method of claim 6 further comprising, by the login endpoint, generating a web token that comprises the grant token and one or more of the following fields:
    an identifier of the first access token;
    an expiration time of the first access token; or
    an address from which an image of the user may be returned.

8. The method of claim 1 further comprising, by the first user agent:
    generating a third authentication request that comprises a request to access a third web resource on the first TLD, the third authentication request including the grant token;
    transmitting the third authentication request to the first re-authentication endpoint serving the first TLD;
    receiving a fourth access token in response to the third authentication request; and
    using the fourth access token to access the third web resource and maintain the web session.

9. The method of claim 1, further comprising, by a second user agent that is being used by the user:
    generating a third authentication request that comprises a request to access a third web resource on the first TLD, and including the grant token in the third authentication request;
    transmitting the third authentication request to the first re-authentication endpoint serving the first TLD;
    receiving a fourth access token in response to the third authentication request; and
    using the fourth access token to access the third web resource and maintain the web session.

10. The method of claim 1, further comprising:
    discovering a second electronic device that is in a communication range of the first electronic device;
    determining that the second electronic device also includes a virtual session manager that includes the grant token;
    when transmitting the first authentication request to login endpoint, doing so via the virtual session manager of the second electronic device so that the second electronic device can present the grant token to the first re-authentication endpoint; and
    when receiving the first access token in response to the first authentication request, doing so via the virtual session manager after the virtual session manager received the first access token from the first re-authentication endpoint.

11. The method of claim 10, wherein:
    identifying the grant token is done by the virtual session manager of the second electronic device and not by the first electronic device; and
    establishing the web session is done without the first electronic device receiving any access to the grant token.

12. The method of claim 10, further comprising, by the first user agent of the first electronic device:
    when receiving the first access token from the virtual session manager, also receiving one or more rules from the virtual session manager; and
    applying the rules when accessing the first web resource.

13. The method of claim 10, further comprising, by the first user agent of the first electronic device:
    when receiving the first access token from the virtual session manager, also receiving a history from the virtual session manager, wherein the history includes one or more parameters associated with the user's prior use of the first web resource; and
    when accessing the first web resource, automatically sending the parameters to the first web resource to maintain or automatically reconnect to the web session so that the web session is uninterrupted without manually entering the parameters.

14. The method of claim 1, further comprising, by the first electronic device:
    determining that the user has a plurality of available login credentials for the first web resource;
    causing the first electronic device to prompt the user to select an account from a set of candidate accounts, wherein each of the candidate accounts is associated with one of the available login credentials;
    receiving, from the user, a selected one of the candidate accounts in response to the prompt; and
    using the login credential for the selected candidate account as the login credential for the first authentication request.

15. A method of maintaining a web session for a user:
    receiving, by a login endpoint of a service provider from a first user agent of a first electronic device, a first authentication request to access a first web resource with which the login endpoint is associated, wherein the first authentication request includes a login credential for the user at the first web resource, wherein the first user agent is a first software application;
    generating, by the login endpoint, a first access token in response to the first authentication request, wherein the first access token will authorize the first user agent to access the first web resource;
    generating, by the login endpoint, a grant token so that the grant token has a life that is longer than a life of the first access token so that the grant token is relatively long-lived and the first access token is relatively short-lived;
    transmitting, by the login endpoint to the first user agent of the first electronic device, the grant token, the first access token, and addresses of a plurality of re-authentication endpoints, wherein each of the plurality of re-authentication endpoints serves a respective top-level domain (TLD) of the service provider, the plurality of re-authentication endpoints includes a first re-authentication endpoint serving a first TLD of the first web resource and a second re-authentication endpoint serving a second TLD of a second web resource, wherein the login endpoint is different from the plurality of re-authentication endpoints;
    establishing, by the login endpoint, a web session for the user;
    when the first access token has expired or is about to expire, receiving, by the first re-authentication endpoint from the first user agent of the first electronic device, a re-authorization request that includes the grant token;
    determining, by the first re-authentication endpoint, whether the grant token is valid;

if the grant token is invalid, denying, by the first re-authentication endpoint, the re-authorization request;
if the grant token is valid, sending, by the first re-authentication endpoint, a second access token to the first electronic device, wherein the first access token will authorize the first user agent to access the first web resource and thus maintain the web session;
receiving, by the second re-authentication endpoint from the first user agent, a second authentication request to access the second web resource on the second TLD,
determining, by the second re-authentication endpoint, that the second authentication request includes the grant token, and confirming that the grant token is valid:
generating, by the second re-authentication endpoint, a third access token in response to the second authentication request, wherein the third access token will permit the first user agent to access the second web resource and maintain the web session; and
transmitting, by the second re-authentication endpoint, the third access token to the first electronic device.

16. The method of claim 15, wherein determining whether the grant token is valid comprises requiring one or more of the following as a condition of determining that the grant token is valid:
determining that the user has not changed an access credential since a most recent prior access request; or
determining that no known account associated with the user has been flagged as having encountered suspicious activity that may indicate that the account has been compromised.

17. The method of claim 15, further comprising, by the first re-authentication endpoint:
receiving a logout command from the user;
determining that the logout command includes an identifier for the grant token;
deleting or causing the first web resource to delete the grant token from a memory; and
causing the first web resource to clear the first access token so that the first access token can no longer be used to access the first web resource.

18. The method of claim 15, further comprising, before generating the grant token, confirming by the login endpoint that the first user agent supports a two-token model by determining whether a header of the first access request includes a two-token model identifier.

19. The method of claim 15, further comprising, by the first re-authentication endpoint:
generating a session record that includes the grant token, a time at which the grant token was created, and an identifier of the user agent; and
maintaining the session record in a memory until the first re-authentication endpoint:
receives a logout command from the user,
determines that more than a threshold number of sessions are currently active for the user, or
determines that an account associated with the user has been flagged as having encountered suspicious activity that may indicate that the account has been compromised.

20. The method of claim 15, further comprising, by the login endpoint, generating a web token that comprises the grant token and one or more of the following fields:
an identifier of the first access token;
an expiration time of the first access token; or
an address from which an image of the user may be returned.

21. The method of claim 15, by the first re-authentication endpoint:
receiving, from the first user agent, a third authentication request to access a third web resource on the first TLD,
determining that the third authentication request includes the grant token, and confirming that the grant token is valid:
generating a fourth access token in response to the third authentication request, wherein the fourth access token will permit the first user agent to access the third web resource and maintain the web session; and
transmitting the fourth access token to the first electronic device.

22. The method of claim 15, by the first re-authentication endpoint:
receiving, from a second user agent that is being used by the user, a third authentication request to access a third web resource on the first TLD,
determining that the third authentication request includes the grant token, and confirming that the grant token is valid:
generating a fourth access token in response to the third authentication request, wherein the fourth access token will permit the second user agent to access the third web resource and maintain the web session; and
transmitting the fourth access token to an electronic device that includes the second user agent.

23. The method of claim 22, wherein the method further comprises, by the login endpoint:
determining that the first authentication request is indirectly received from the first user agent of the first electronic device via a second electronic device that includes a virtual session manager; and
after generating the grant token, transmitting the grant token to the second electronic device but not to the first electronic device.

* * * * *